(12) United States Patent
Itou

(10) Patent No.: US 7,931,074 B2
(45) Date of Patent: Apr. 26, 2011

(54) HEAT EXCHANGER AND AIR CONDITIONER

(75) Inventor: Kouji Itou, Nagoya (JP)

(73) Assignee: Denso Corporation, Kariya (JP)

( * ) Notice: Subject to any disclaimer, the term of this patent is extended or adjusted under 35 U.S.C. 154(b) by 1069 days.

(21) Appl. No.: 11/633,681

(22) Filed: Dec. 4, 2006

(65) Prior Publication Data

US 2007/0125521 A1 Jun. 7, 2007

(30) Foreign Application Priority Data

Dec. 6, 2005 (JP) .................................. 2005-351888
Apr. 14, 2006 (JP) .................................. 2006-111823

(51) Int. Cl.
*B60H 1/00* (2006.01)

(52) U.S. Cl. .......... 165/202; 165/42; 165/101; 165/103; 165/144

(58) Field of Classification Search .................. 165/41, 165/442, 43, 44, 95, 97, 101, 102, 103, 124, 165/125, 144, 202, 42; 454/50

See application file for complete search history.

(56) References Cited

U.S. PATENT DOCUMENTS

| | | | | |
|---|---|---|---|---|
| 1,378,715 A | * | 5/1921 | Nielsen et al. | 165/95 |
| 3,522,841 A | * | 8/1970 | Spyros | 165/103 |
| 3,627,033 A | * | 12/1971 | Ringquist | 165/103 |
| 3,943,995 A | * | 3/1976 | Banko | 165/101 |
| 4,064,934 A | * | 12/1977 | Kolthoff et al. | 165/97 |
| 4,116,265 A | * | 9/1978 | Staebler | 165/103 |
| 4,202,296 A | * | 5/1980 | Nonnenmann et al. | 165/125 |
| 4,284,132 A | * | 8/1981 | Strand, Sr. | 165/103 |
| 4,367,787 A | * | 1/1983 | Bradshaw | 454/50 |
| 4,574,868 A | * | 3/1986 | Anders | 165/144 |
| 4,657,070 A | * | 4/1987 | Kluppel | 165/124 |
| 5,046,550 A | * | 9/1991 | Boll et al. | 165/41 |
| 5,062,473 A | | 11/1991 | Ostrand et al. | |

(Continued)

FOREIGN PATENT DOCUMENTS

JP 58-142577 9/1983

(Continued)

OTHER PUBLICATIONS

Office Action dated Jun. 22, 2010 in Japanese Application No. 2006-111823.

*Primary Examiner* — Ljiljana (Lil) V Ciric

(74) *Attorney, Agent, or Firm* — Harness, Dickey & Pierce, PLC

(57) ABSTRACT

A heat exchanger includes tubes which are arranged in parallel and through which a fluid for heating air flows. Fins which are joined to the tubes. The tubes and the fins are arranged to form three or more heating parts and at least two bypass passages each of which is provided between adjacent heating parts, through which the air passes without exchanging heat with the thermal fluid. First and second tank parts are arranged at two longitudinal ends of the tubes and extend across the bypass passages and the heating parts. The bypass passages and the heating parts are arranged perpendicular to an air flow direction. The heating heat exchanger is disposed in an air conditioning case down stream from an evaporator. The air conditioning case is separated into two air outlets. Cold air from the bypass passages and hot air from the heating parts are mixed prior to being blown through the air outlets.

21 Claims, 11 Drawing Sheets

U.S. PATENT DOCUMENTS

| | | |
|---|---|---|
| 6,435,264 B1 * | 8/2002 | Konno et al. .................. 165/41 |
| 2005/0045320 A1 | 3/2005 | Richter et al. |

FOREIGN PATENT DOCUMENTS

| JP | 09-175148 | 7/1997 |
|---|---|---|
| JP | 11-301249 | 11/1999 |
| JP | 2000-016053 | 1/2000 |
| JP | 2000-118228 | 4/2000 |
| JP | 2004-237797 | 8/2004 |
| JP | 2005-138618 | 6/2005 |

* cited by examiner

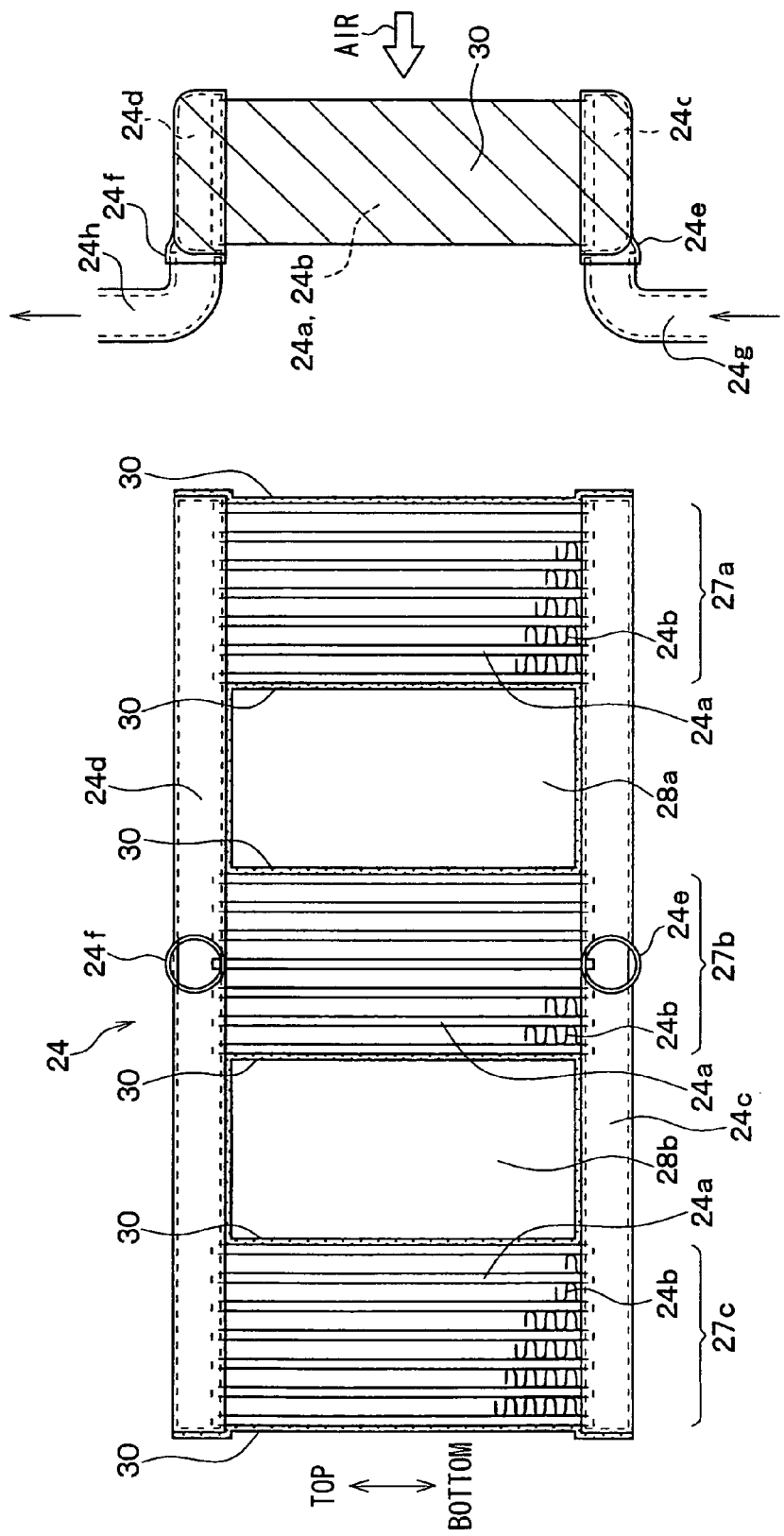

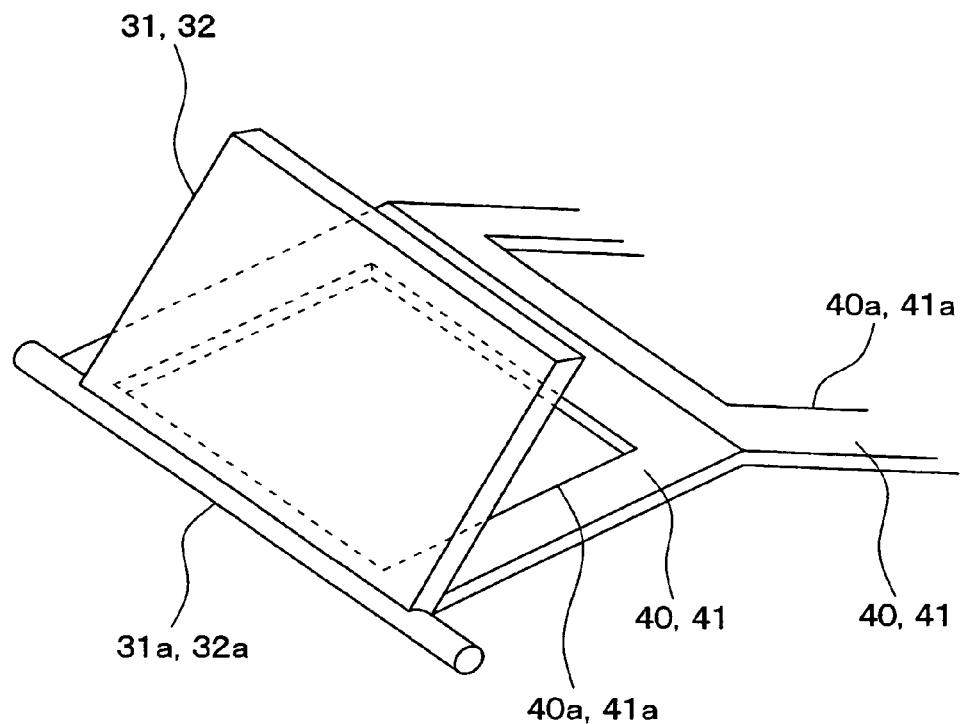
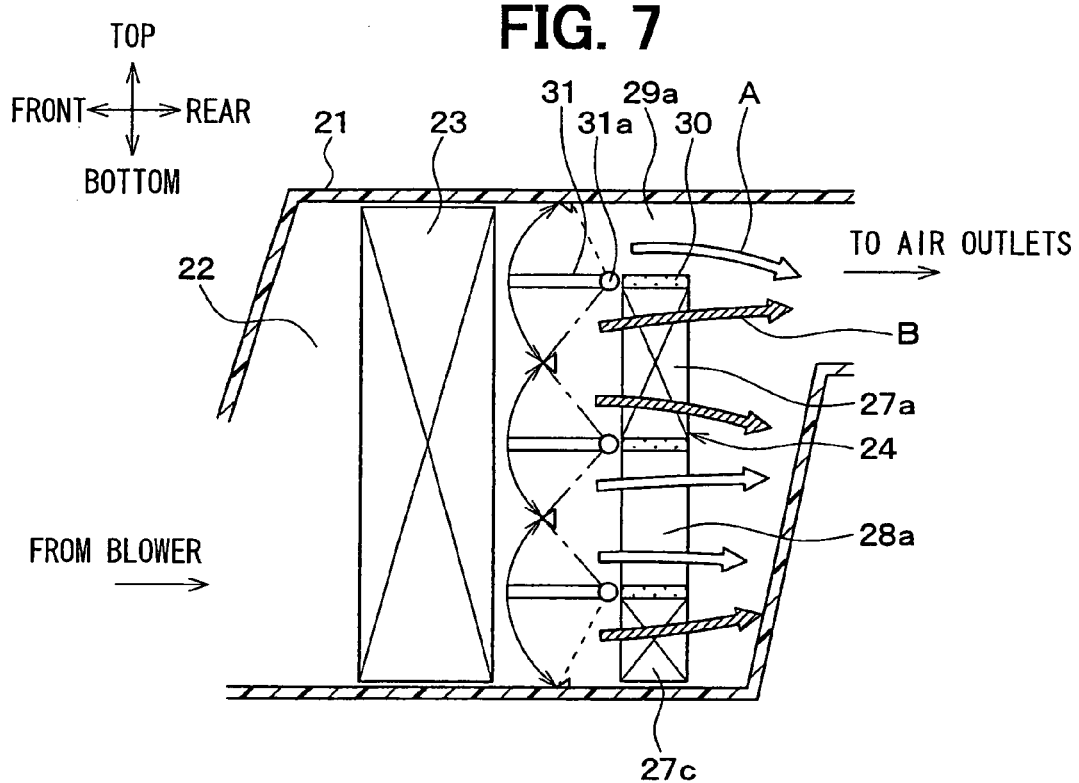
FIG. 7

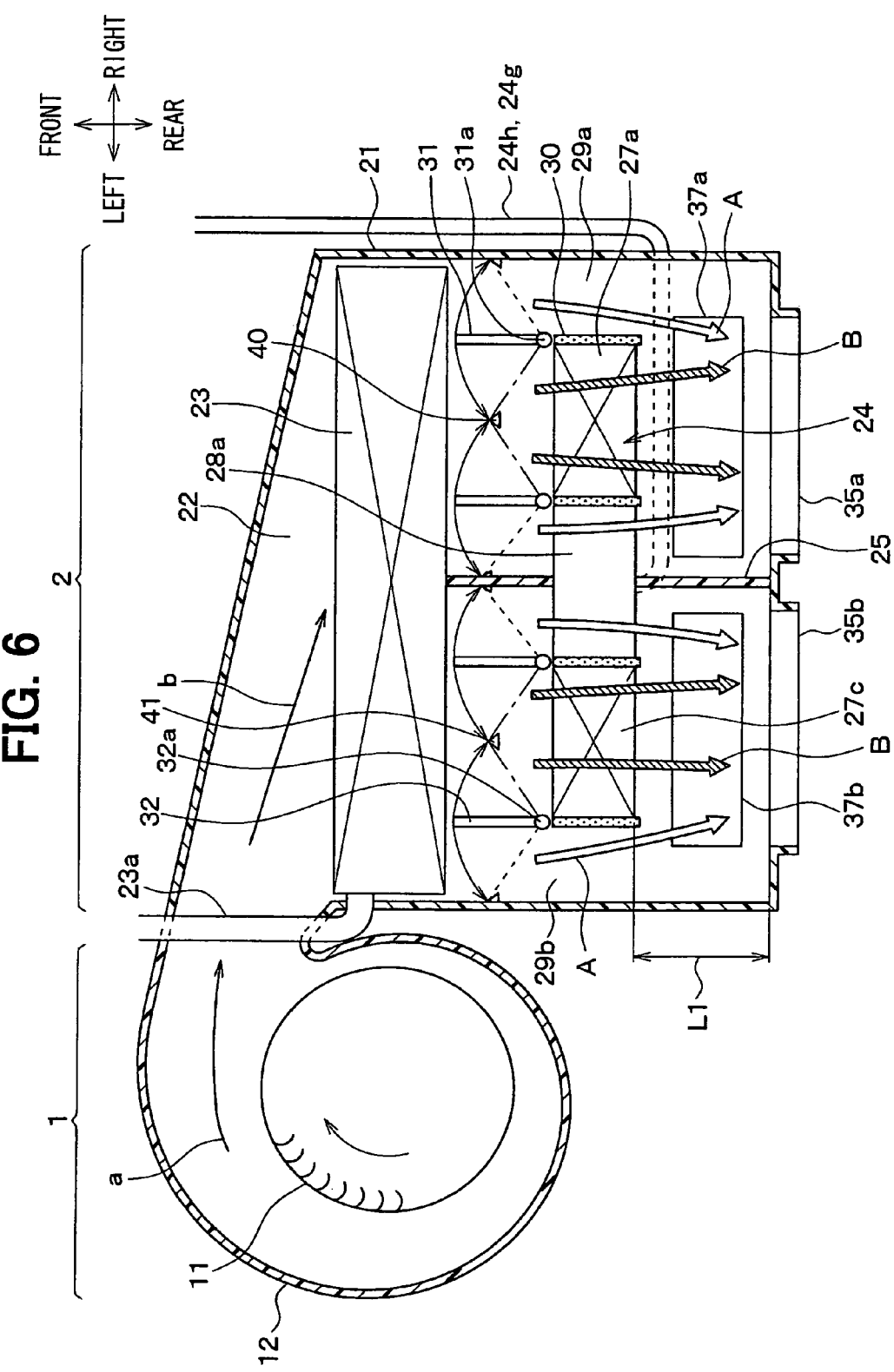

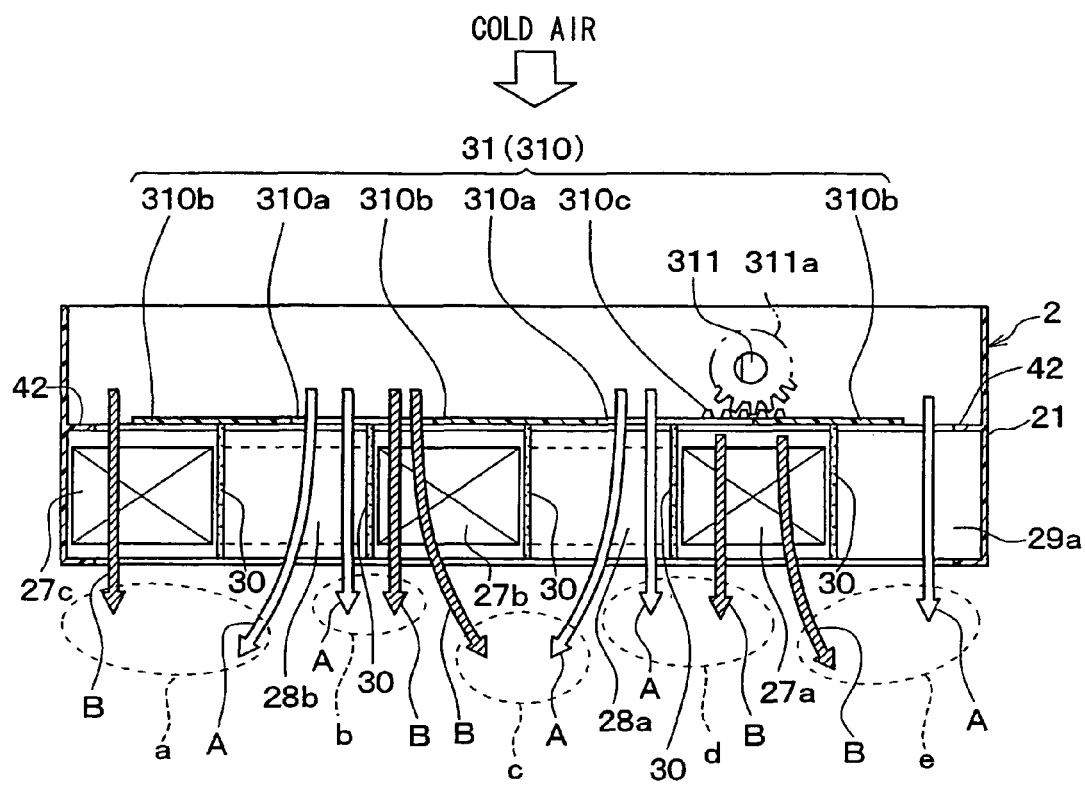
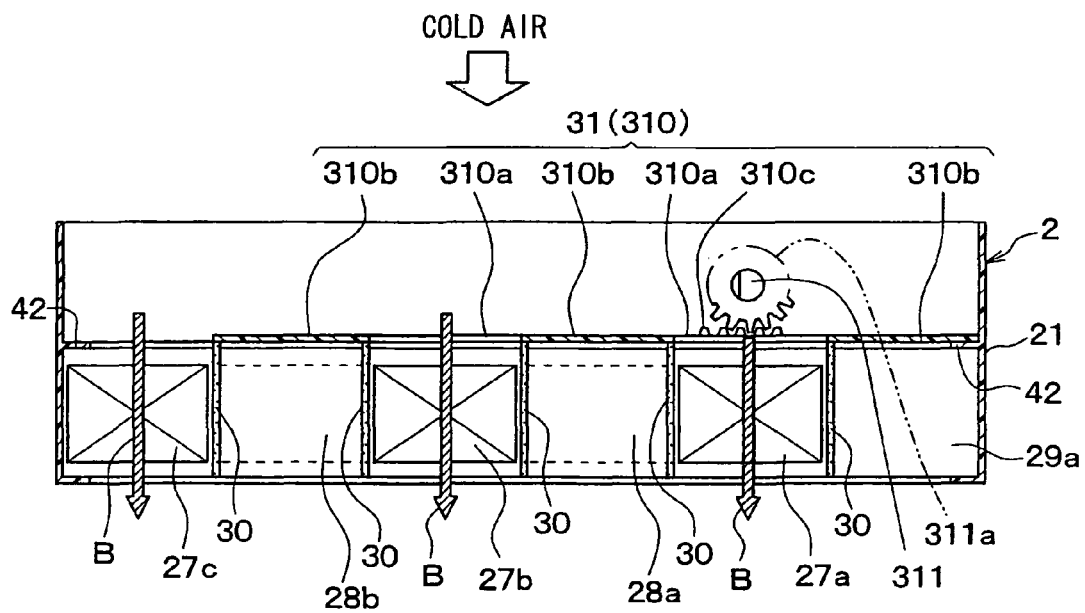

HEAT EXCHANGER AND AIR CONDITIONER

CROSS REFERENCE TO RELATED APPLICATION

This application is based on Japanese Patent Applications No. 2005-351888 filed on Dec. 6, 2005, and No. 2006-111823 filed on Apr. 14, 2006, the contents of which are incorporated herein by reference in its entirety.

FIELD OF THE INVENTION

The present invention relates to an air conditioner that adjusts the ratio between cold air and hot air to adjust the temperature of air blown into a room, and a heat exchanger used for an air conditioner.

BACKGROUND OF THE INVENTION

Conventionally, an air-mixing type air conditioner, which adjusts the ratio between cold air and hot air to adjust the temperature of air blown into a room, is a typical air conditioner for a vehicle. FIG. 15 shows a conventional structure of this air-mixing type air conditioner and shows a right-and-left independent control type air conditioner in which an air passage in a case 21 is partitioned into a right air passage 26a and a left air passage 26b by a partition plate 25 and in which the temperatures of air to be blown into the right and left air passages are independently controlled.

Specifically, cold air bypass passages 29a, 29b are formed on both of the right and left sides of a heating heat exchanger 24. Furthermore, the ratio between cold air passing through these cold air bypass passages 29a, 29b and hot air passing through the right and left heat exchange portions of the heating heat exchanger 24 is adjusted by right and left air mixing doors 31, 32 to independently control the temperature of air blown into the right and left zones in a vehicle compartment.

On the other hand, U.S. Pat. No. 5,062,473 proposes an air mix type air conditioner in which: an opening for passing air is formed in a center area of a heat exchanger for heating air (heater core); a heating part for heating air by using hot water (engine cooling water) as a heat source is set on both sides of the opening in the center area; and the open ratio between the opening in the center area and the heating parts set on both sides is adjusted by two air mixing doors (i.e., sliding doors).

In the conventional structure shown in FIG. 15, a cold air flow A and a hot air flow B are formed singly in the respective right and left air passages 26a, 26b partitioned by the partition plate 25. These cold air flow A and hot air flow B flow are made in parallel toward an air blowoff opening (air outlet opening), for example, face opening parts 35a, 35b on a downstream side of the heating heat exchanger 24.

As a result, when a distance L1 from the heating heat exchanger 24 to the air blowoff openings (face opening parts 35a, 35b) is short, cold air and hot air are blown into the vehicle compartment before they are not sufficiently mixed with each other, thereby causing a problem that variations in the temperature of air blown into the vehicle compartment are large. To overcome this problem, an air guide for making cold air collide with hot air to mix them sufficiently may be provided on the downstream side of the air flow of the heating heat exchanger. However, in this case, the installation of the air guide will increase a pressure loss of the air flow.

By contrast, in U.S. Pat. No. 5,062,473, cold air passes through the opening in the center area of the heat exchanger for heating air and hot air passes on both sides of the cold air flow in the center area and hence the contact parts of the cold air and the hot air are formed on both sides of the opening in the center area. However, even in U.S. Pat. No. 5,062,473, when the above-described distance L1 is short, the cold air is not sufficiently mixed with the hot air, which results in increasing variations in the temperature of air blown into the vehicle compartment.

SUMMARY OF THE INVENTION

In view of the above-described problems, an object of the present invention is to avoid an increase in a pressure loss of an air flow and to enhance the degree of mixing of cold air and hot air in an air conditioner.

It is another object of the present invention to provide a heat exchanger and a heating heat exchanger, which improve air mixing performance.

According to an aspect of the present invention, a heating heat exchanger includes a plurality of tubes which are arranged in parallel and through which a thermal fluid for heating air flows, a plurality of fins which are joined to the tubes and form heat transfer surfaces in contact with the air. The tubes and the fins are arranged to form a plurality of heating parts equal to or more than three in which the air is heated. Furthermore, a plurality of bypass passages each of which is provided between adjacent heating parts are provided so that the air passes through the bypass passages without exchanging heat with the thermal fluid. First and second tank parts, for distributing the thermal fluid to the tubes and for collecting the thermal fluid from the tubes, are arranged at two longitudinal ends of the tubes and extend to across an area where the bypass passages and the heating parts are provided. In addition, the bypass passages and the heating parts are arranged in an arrangement direction perpendicular to an air flow direction.

Since two or more bypass passages are combined with three or more heating parts located on both sides of the bypass passage, four or more mixing portions can be formed where air (e.g., cold air) flowing through the bypass passages contacts and is mixed with hot air passing through the heating parts. By increasing the number of contact portions (mixing portions) of cold air and hot air in this manner, cold air can be uniformly mixed with hot air and the degree of mixing of cold air and hot air can be substantially enhanced.

Accordingly, when the heating heat exchanger is located in a case of an air conditioner, even if the distance between air mixing parts provided on the downstream side of the air flow of the heating heat exchanger is made shorter, the temperature distribution of air blown into the compartment can be made uniform. When two or more bypass passages and three or more heating parts are alternately formed in the heating heat exchanger itself, an air guide for enhancing the degree of mixing of cold air and hot air does not need to be provided on the downstream side of the air flow of the heating heat exchanger. As a result, in the air conditioner, the degree of mixing of cold air and hot air can be increased without increasing a pressure loss of the air flow.

For example, a thermal insulating member can be arranged at boundary areas between each bypass passage and the heating parts and at boundary areas between each bypass passage and the tank parts.

According to another aspect of the present invention, a heat exchanger includes a plurality of tubes which are arranged in parallel and in which a thermal fluid for exchanging heat with air flows, and a plurality of fins which are joined to the tubes and form heat transfer surfaces in contact with the air. The tubes and the fins are arranged to form a plurality of heat exchanging parts equal to or more than three in which the air is heat-exchanged with the air, and a plurality of bypass passages each of which is provided between adjacent heating, parts are provided such that the air passes through the bypass passages without exchanging heat with the thermal fluid. Furthermore, a tank is arranged at a longitudinal end of each tube to extend in a tank longitudinal direction in an area where the bypass passages and the heating parts are arranged in an arrangement direction that is parallel to the tank longitudinal direction. Even in this case, air passing through the heat exchanging parts and air passing through the bypass passages can be effectively mixed, and air mixing performance can be improved.

According to further another aspect of the present invention, an air conditioner includes a case for defining an air passage through which air flows into the compartment, a heating heat exchanger which is located in the case to heat air in the air passage, and a door member which is located in the case. Here, in the heating heat exchanger, tubes and fins are arranged to form a plurality of heating parts equal to or more than three in which the air is heated, and an inner bypass passage is provided between adjacent heating parts, through which the air passes without exchanging heat with the thermal fluid. Furthermore, the heating heat exchanger is located in the case to form an outer bypass passage through which air bypasses the heating heat exchanger. In addition, the inner bypass passage, the outer bypass passage and the heating parts are arranged in an arrangement direction perpendicular to an air flow direction, and the door member is located to open and close the inner bypass passage, the outer bypass passage and air paths of the heating parts. Accordingly, the air mixing performance can be improved even when an air mixing area is made small in the air conditioner.

For example, the outer bypass passage can be provided at two outer sides of the heating parts positioned at two end parts in the heating heat exchanger in the arrangement direction.

BRIEF DESCRIPTION OF THE DRAWINGS

Additional objects and advantages of the present invention will be more readily apparent from the following detailed description of preferred embodiments when taken together with the accompanying drawings.

FIG. 4A is a front view of a heater core of the first embodiment, and FIG. 4B is a side view of the heater core.

FIG. 5 is a perspective view to show a schematic arrangement of an air mixing door and a seal wall surface on a case side of the first embodiment.

FIG. 6 is a cross-sectional view of an interior unit of an air conditioner for a vehicle according to a second embodiment of the present invention.

FIG. 7 is a schematic cross-sectional view showing an air mixing structure of an air-conditioning unit part of an interior unit of an air conditioner for a vehicle according to a third embodiment of the present invention.

FIG. 10 is a schematic cross-sectional view showing the air conditioning unit part of FIG. 8 in a middle temperature control operation.

FIG. 11 is a schematic cross-sectional view showing the air conditioning unit part of FIG. 8 in a maximum heating operation.

DETAILED DESCRIPTION OF THE PREFERRED EMBODIMENTS

First Embodiment

Figure 1:
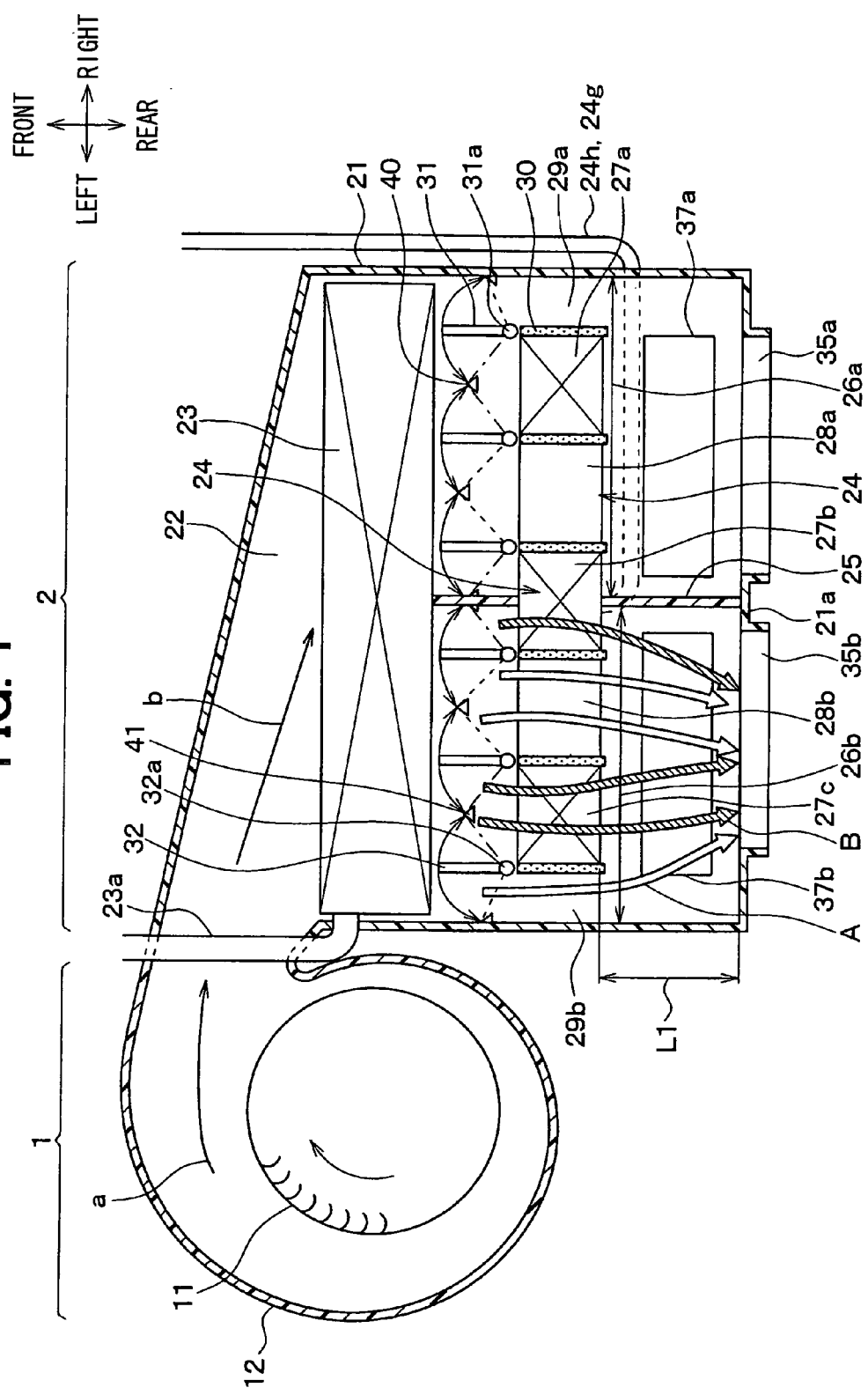
FIG. 1 is a schematic cross-sectional view of an interior unit of an air conditioner for a vehicle according to a first embodiment of the present invention.

As shown in FIG. 1, an interior unit of an air conditioner for a vehicle is located in a vehicle compartment, and is broadly divided into tow parts of a blower unit 1 and an air conditioning unit 2 in this embodiment. The air conditioning unit 2 is located nearly in a center area in the right and left direction of the vehicle inside an instrument panel (dashboard) on the front of the vehicle compartment.

In contrast to this, the blower unit 1 is arranged offset to a position on the front of a front passenger's seat, that is, to a side of the air conditioning unit 2 in the right and left direction of the vehicle. Here, this embodiment, the air conditioner is typically used for a car with a right-hand steering wheel in which a front passenger's seat is located on the left side of the vehicle.

The blower unit 1 has a well-known construction including a blower fan 11 made of a centrifugal fan having many blades arranged in the shape of a circular ring, a motor (not shown) for rotating and driving this blower fan 11, and a convolute scroll case 12 for housing the blower fan 11.

In the blower unit 1, an inside/outside air switching box (not shown) is arranged on the tip portion of the blower fan 11 so that outside air (i.e., air outside the vehicle compartment) and inside air (i.e., air inside the vehicle compartment) are switched by and introduced from this inside/outside air switching box and the introduced air is blown to the air conditioning unit 2 on the right side of the vehicle as shown by arrows "a" and "b".

The air conditioning unit 2 has an air conditioning case 21 made of resin, and this case 21 is formed by combining two divided case members by appropriate fastening means such as a metal spring clamp or screws. For example, the case 21 is divided into right and left case members by a dividing plane (not shown) located at the center in the right and left (width) direction of the vehicle.

An air inlet space 22 to which an air outlet part of the scroll case 13 is connected is formed at the forefront of the vehicle in this case 21. Thus, when the blower fan 11 in the blower unit 1 is operated, air flows into the space 22 formed at the forefront in the case 21.

The air in the blower unit 1 flows from the front side of the vehicle to the rear side of the vehicle in the case 21. In the case 21, an evaporator 23 and a heater core 24 are arranged in series in this order from the upstream side of the air flow.

In this embodiment, the air conditioning unit 2 is constructed in a left-and-right independent control type. For this reason, of the air passage in the case 21, a region on the downstream side of the air flow of the evaporator 23 is partitioned into a right air passage 26a and a left air passage 26b by a partition plate 25. That is, the partition plate 25 is arranged approximately at the center in the right and left direction of the vehicle in an area between the evaporator 23 and the heater core 24 and in an area between the heater core 24 and the rear wall 21a (e.g., wall surface on the most downstream side of the air flow) of the vehicle of the case 21 to partition the air passage into the right air passage 26a and the left air passage 26b.

Although the partition plate 25 is shown as a member separate from the case 21, the partition plate 25 may be formed integrally with the case 21. Since an example in which an air conditioner is mounted in car with a right-hand steering wheel is shown in this embodiment as described above, the right air passage 26a of the vehicle is used as a driver's seat side air passage, and the left air passage 26b of the vehicle is used as a front passenger's seat side air passage.

The evaporator 23 constructs a well-known refrigeration cycle with a compressor, a condenser and pressure reducing means (which are not shown), and is a cooling heat exchanger for cooling air in the case 21. The evaporator 23 has a plurality of tubes (not shown), each of which has a flat cross section and through which low-pressure refrigerant having its pressure reduced by the pressure reducing means flows. In the evaporator 23, the tubes are arranged in parallel at specified intervals, and corrugated fins are arranged between and joined to the tubes, thereby constructing a heat exchange part. The evaporator 23 is connected to a refrigeration cycle unit located in a vehicle engine room by refrigerant piping 23a.

Moreover, the heater core 24 is a heating heat exchanger for heating air in the case 21 by using hot water (engine cooling water) flowing therein as a heat source. The heater core 24, as shown in FIG. 4A, has a plurality of tubes 24a, each of which has a flat cross section and through which hot water flows. In the heater core 24, the tubes 24a are arranged in parallel at specified intervals, and corrugated fins 24b are arranged between and joined to the tubes 24a, thereby constructing a heat exchange part.

The tubes 24a are arranged in parallel in the right and left direction of the vehicle (in the direction perpendicular to the air flow) in a state where they extend to the up and down direction. Both of the top and bottom ends of the tubes 24a communicate with the insides of the top and bottom tank parts 24c, 24d and are joined to the top and bottom tank parts 24c, 24d. Hence, the direction of the extending length of the each of the top and bottom tank parts 24c, 24d points to the direction perpendicular to the air flow direction. That is, each of the tank parts 24c, 24d extends in the right and left direction of the vehicle.

A hot water inlet part 24e is formed in a center area in the direction of the length of the bottom tank part 24c, thereby the bottom tank part 24c is constructed as a hot water inlet tank. Moreover, a hot water outlet part 24f is formed in a center area in the direction of the length of the top tank part 24d, thereby the top tank part 24d is constructed as a hot water outlet tank.

Figure 3:
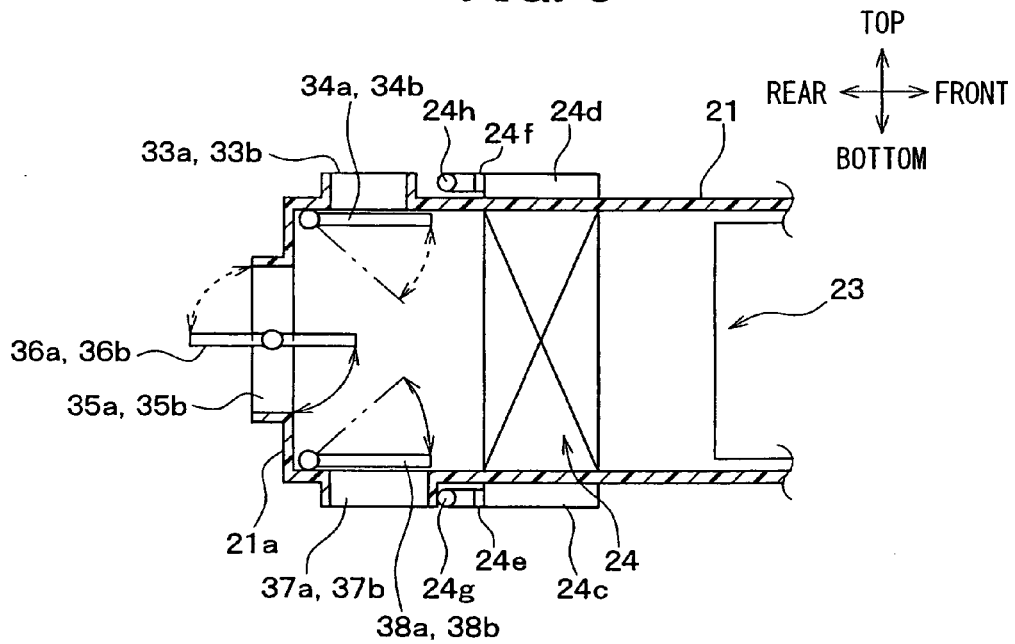
FIG. 3 is a schematic cross-sectional view showing an air mixing structure of the air-conditioning unit part in FIG. 2.

Hot water inlet/outlet pipings 24g, 24h are connected to these hot water inlet/outlet parts 24e, 24f, as shown in FIG. 4B. Here, since the top and bottom tank parts 24c, 24d project to the outside of the top surface wall and the bottom surface wall of the case 21, as shown in FIG. 3, the connecting of the hot water piping 24g to the hot water inlet part 24e and the connecting of the hot water piping 24h to the hot water inlet part 24f can be performed outside the case 21, respectively.

According to the above-described construction of the heater core 24, the hot water of a vehicle-engine hot water circuit flows from the hot water inlet part 24e to the bottom tank part 24c through the hot water inlet piping 24g. This hot water is distributed to the whole tubes 24a arranged in parallel and goes up in the whole tubes 24a and flows into the top tank part 24d.

Then, the hot water is collected in the top tank part 24d and is returned from the hot water outlet part 24f to the vehicle-engine hot water circuit through the hot water outlet piping 24h. In this manner, in the heater core 24 of this embodiment, the hot water flows in one direction from the bottom to the top through the whole the tubes 24a, so the heater core 24 is constructed as a one-direction flow type (whole pass type) heater core.

Further, in the heater core 24, a heat exchange portion located between the top and bottom tank parts 24c, 24d is divided into, for example, five parts including first to third heating parts 27a, 27b, and 27c and first and second cold air bypass passage parts 28a, 28b.

Here, the first to third heating parts 27a, 27b, and 27c and the first and second cold air bypass passage parts 28a, 28b are alternately arranged in the direction of the tank length (tank longitudinal direction), and the first to third heating-parts 27a, 27b, and 27c are arranged on both right and left sides of the first and second cold air bypass passage parts 28a, 28b.

Each of the first to third heating parts 27a, 27b and 27c is formed of a combination of the plurality of tubes 24a and the plurality of corrugated fins 24b, and heats air passing through spaces between the tubes 24a and the corrugated fins 24b by the heat of the hot water.

The first and second cold air bypass passage parts 28a, 28b are formed as air passing spaces where the tubes 24a and the corrugated fins 24b are not provided and are portions through which the cold air after passing the evaporator 23 passes without exchanging heat with the hot water.

Here, the size of width of the heater core 24 in the right and left direction of the vehicle is made smaller than the size of width in the right and left direction of the vehicle of the air passage in the case 21 by a predetermined amount, as shown in FIG. 1. With this, cold air bypass passages 29a, 29b outside the heater core 24 are formed on the side portions of the ends of the heater core 24 in the direction of the length of the tank (in the right and left direction of the vehicle), in other words, on the side portions of the heating parts 27a, 27c of both side ends of the heater core 24, respectively.

Of the respective tubes 24a of the first to third heating parts 27a, 27b and 27c, the tubes 24a located at the ends in the direction of the length of the tank (in the right and left direction of the vehicle) are located at the boundary between the first and second cold bypass passages 28a, 28b and the cold bypass passages 29a, 29b, respectively.

Thermal insulating members 30 are fixed by bonding or the like to the surfaces, contacting with the cold air bypass passages 28a, 28b, 29a, 29b, of the respective tubes 24a located at the ends in the direction of the length of the tank (in the right and left direction of the vehicle) of the first to third heating parts 27a, 27b and 27c. Similarly, thermal insulating members 30 are fixed by bonding or the like to the surfaces, contacting with the cold air bypass passages 28a, 28b, 29a and 29b, of the top and bottom tank parts 24c, 24d.

Therefore, each of the cold air bypass passages 28a, 28b in the heater core 24 is constructed so as to have four sides of its rectangular cross section surrounded by the thermal insulating members 30.

Moreover, the thermal insulating members 30 located on both side ends of the heater core 24 in the direction of the length of the tank (in the right and left direction of the vehicle), as shown in FIG. 4A, are provided so as to extend from the region of the heating parts 27a, 27c on both side ends to the sides of the tank (i.e., tank parts 24c, 24d). A hatched portion in FIG. 4B shows the installation range of the thermal insulating member 30, and the thermal insulting member 30 can be made of resin foaming material or the like.

By arranging the thermal insulating members 30 in this manner, heat transferring from the tubes 24a to the air (cold air) passing through the cold air bypass passages 28a, 28b, 29a, 29b at the time of a maximum cooling operation can be sufficiently reduced.

Next, a temperature adjusting mechanism for adjusting temperature of air blown into the vehicle compartment from the right air passage 26a of the vehicle and the left air passage 26b of the vehicle will be described. A plurality of right air mixing doors 31 (e.g., three doors in this embodiment) are arranged on the upstream side of the air flow of the heater core 24 in the right air passage 26a of the vehicle. Similarly, a plurality of left air mixing doors 32 (e.g., three doors in this embodiment) are arranged on the upstream side of the air flow of the heater core 24 in the left air passage 26b of the vehicle.

These right and left air mixing doors 31, 32 are constructed of rectangular plate doors rotating around rotary shafts 31a, 32a, respectively. These rotary shafts 31a, 32a are arranged at the boundaries between the respective heating parts 27a to 27c and the cold air bypass passages 28a, 28b, 29a, and 29b at an upstream part of the heater core 24.

The rotary shafts 31a of the three air mixing doors 31 are coupled to a right air mixing driving mechanism (not shown) via a link mechanism (not shown) and the three right air mixing doors 31 are operated in association with each other by this right air mixing driving mechanism.

Similarly, the rotary shafts 32a of the three air mixing doors 32 are also coupled to a left air mixing driving mechanism (not shown) via a link mechanism (not shown) and the three left air mixing doors 32 are operated in association with each other by this left air mixing driving mechanism.

The right and left air mixing driving mechanisms are constructed independently of actuator mechanisms using a servo motor, respectively, and the degrees of opening of the right and left air mixing doors 31, 32 can be independently adjusted by independently controlling the operating angle (amount of rotation) of the right and left servo motors.

Seal wall surfaces 40, 41 for guaranteeing the seal actions (air passage closing actions) of the respective air mixing doors 31, 32 at the time of a maximum cooling operation and at the time of a maximum heating operation of the respective air mixing doors 31, 32 are provided in correspondence with the respective air mixing doors 31, 32.

In FIG. 1, the positions, shown by broken lines, of the respective air mixing doors 31, 32 show the positions of the maximum heating operation at which the cold air bypass passages 28a, 28b, 29a, and 29b are totally closed, and the positions, shown by single dot and dash lines, of the respective air mixing doors 31, 32 show the positions of the maximum cooling operation at which the air passages of the heating parts 27a, 27b, and 27c are totally closed. The positions, shown by solid lines, of the respective air mixing doors 31, 32 show middle positions between the positions of the maximum heating operation and the positions of the maximum cooling operation.

The right seal wall surface 40 is arranged in the case 21 at the right air passage 26a and is a part against which the rectangular outside edge portion of the right air mixing door 31 abuts when the right air mixing door 31 rotates to the position of the maximum heating operation or the position of the maximum cooling operation.

The left seal wall surface 41 is arranged in the case 21 at the left air passage 26b and is a part against which the rectangular outside edge portion of the left air mixing door 32 abuts when the left air mixing door 32 rotates to the position of the maximum heating operation or the position of the maximum cooling operation.

For this reason, each of the seal wall surfaces 40, 41, as shown in FIG. 5, is formed in the shape of a letter V corresponding to the outside edge portion of each of the right and left air mixing doors 31, 32. Here, each of the seal wall surfaces 40, 41 is formed integrally with the inside wall surface of the case 21, however may be a separate member fixed to the inside wall surface of the case 21 after being separately formed.

Each of the V-shaped seal wall surfaces 40, 41 is formed to extend to each of the rotary shafts 31a, 32a of the air mixing doors 31, 32 from a portion between the evaporator 23 and the heater core 24. Here, of the seal wall surfaces 40, 41, each of the seal wall surfaces 40, 41 located in the middle of the respective air mixing doors 31, 32 is formed in an angular shape by combining two adjacent seal wall surfaces, as shown in FIG. 5. FIG. 1 shows the cross-sectional shape of the tip portion of this angular-shaped seal wall surface 40, 41. In FIG. 5, the openings 40a, 41a provided in the seal surface wall surfaces 40, 41 construct the air inlets of the cold air bypass passages 28a, 28b, 29a, 29b or the heating parts 27a, 27b, and 27c.

Of the seal wall surfaces 40, 41, each of the seal wall surfaces 40, 41 on the right and left ends arranged on the inside wall portions of the right and left side walls of the case 21 is formed by only the one-side wall of the angular-shaped seal wall surface 40, 41 shown in FIG. 5.

Of the three right air mixing doors 31, the positions of the maximum heating operation (shown by broken lines) and the positions of the maximum cooling operation (shown by single dot and dash lines) of the adjacent air mixing doors 31 are reverse to each other. Similarly, of the three left air mixing doors 32, the positions of the maximum heating operation (shown by broken lines) and the positions of the maximum cooling operation (shown by single dot and dash lines) of the adjacent air mixing doors 32 are reverse to each other.

For this reason, of the three right air mixing doors 31, the adjacent air mixing doors 31 are operated in association with each other so as to rotate in directions opposite to each other. Similarly, of the three left air mixing doors 32, the adjacent air mixing doors 32 are operated in association with each other so as to rotate in directions opposite to each other.

Figure 2:
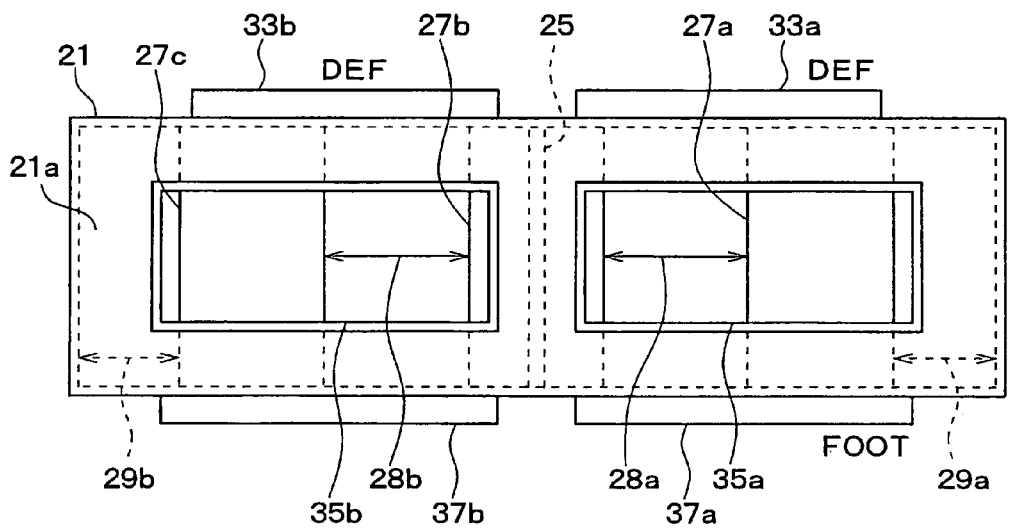
FIG. 2 is a front view of an air-conditioning unit part of the interior unit in FIG. 1.

Next, an air outlet opening switching mechanism will be described. Right and left defroster openings 33a, 33b (FIG. 2 and FIG. 3) are formed in the top wall of the case 21 on the downstream side of the air flow (on the rear side of the vehicle) of the heater core 24. These defroster openings 33a, 33b are used for blowing out air-conditioned air toward the inside surface of the front glass (windshield) of the vehicle. These right and left defroster openings 33a, 33b are opened and closed by right and left defroster doors 34a, 34b (FIG. 3).

Moreover, right and left face openings 35a, 35b are formed in the rear wall 21a of the case 21 in the vehicle front-rear direction. For this reason, the face openings 35a, 35b, as shown in FIG. 3, are arranged so as to opposite to the downstream side of the air flow (on the rear side of the vehicle) of the heater core 24.

These right and left face openings 35a, 35b are used for blowing out air-conditioned air toward the upper half body of an occupant in the vehicle compartment. These right and left face openings 35a, 35b are opened and closed by right and left face doors 36a, 36b (FIG. 3).

Moreover, right and left foot openings 37a, 37b are formed in the bottom surface wall of the case 21.

These right and left foot openings 37a, 37b are used for blowing out air-conditioned air toward the feet of the occupant in the vehicle compartment. These right and left foot openings 37a, 37b are opened and closed by right and left food doors 38a, 38b (FIG. 3).

This embodiment uses the system of switching right and left air outlet modes in association with each other. Thus, the right and left defroster doors 34a, 34b, the right and left face doors 36a, 36b, and the right and left foot doors 38a, 38b are coupled to an air outlet mode operating mechanism that is common to the right and left sides, thereby the whole right and left outlet mode doors 34a, 34b, 36a, 36b, 38a, and 38b are operated in association with each other.

The air outlet mode operating mechanism common to the right and left sides is constructed of an actuator mechanism having a single servo motor and controls the operating angle (the amount of rotation) of this servo motor to open and close the above-described respective doors via a link mechanism.

In this embodiment, a face mode, a bi-level mode, a foot and defroster mode, and a defroster mode, which are publicly known, can be switched and set as the outlet mode of air blown into the vehicle compartment by opening and closing the above-described right and left outlet mode doors 34a, 34b, 36a, 36b, 38a, and 38b. Here, the air outlet mode operating mechanisms may be provided independently for the right and left sides and may open and close the right and left air outlet mode doors independently of each other.

Next, the operation of this embodiment will be described in the above-described construction. If electric current is passed through the motor (not shown) for driving the blower fan 11 of the blower unit 1 to rotate and drive the blower fan 11, outside air or/and inside air is switched and introduced by the inside/outside air switching box (not shown), and the introduced air is blown to the inlet space 22 at the forefront of the air conditioning unit 2 as shown by arrows "a", "b" in FIG. 1.

Moreover, when the compressor of a refrigeration cycle (not shown) is driven by a vehicle engine, the refrigeration cycle having the evaporator 23 is brought into an operating state, thereby the evaporator 23 exerts a cooling action. For this reason, in the air conditioning unit 2, when air blown into the inlet space 22 first passes through the evaporator 23, the air is cooled and dehumidified by the evaporator 23, thereby being brought to cold air.

When the respective air mixing doors 31, 32 are operated to the positions shown by solid lines in FIG. 1, the respective air mixing doors 31, 32 open the openings 40a, 41a of the respective seal wall surfaces 40, 41, that is, the respective air inlets of the cold air bypass passages 28a, 28b, 29a and 29b, and the heating parts 27a, 27b and 27c by the same degree of opening.

For this reason, about half of cold air passing through the evaporator 23 passes through three heating parts 27a, 27b, and 27c of the heater core 24, thereby being heated and brought to hot air. The remaining air about half of the cold air passes through the two cold air bypass passages 28a, 28b in the heater core 24 and the cold air bypass passages 29a, 29b outside the heater core 24 located on the right and left sides of the heater core 24.

Here, in the respective cold air bypass passages 28a, 28b, 29a and 29b, heat transferring from the heating parts 27a, 27b, and 27c can be sufficiently reduced by the thermal insulating effect of the thermal insulating members 30, so the cold air passes through the respective cold air bypass passages 28a, 28b, 29a and 29b without being heated.

In this manner, the hot air at three positions of the heating parts 27a, 27b, and 27c and the cold air at four positions of the cold air bypass passages 28a, 28b, 29a and 29b can form multi-layer flow flowing alternately in the right and left direction of the vehicle (in the direction of the length of the heater core tank and in the direction perpendicular to the air flow). With this, air mixing portions where the hot air is put into contact with and is mixed with the cold air are formed at six positions in the case 21 in the right and left direction of the vehicle, thereby the mixing portions (contact portions) for mixing the hot air and the cold air can be increased.

With this, it is possible to mix the hot air and the cold air uniformly and to enhance the degree of mixing of the hot air and the cold air to a large extent. Hence, even if the distance L1 between the face openings 35a, 35b facing to the downstream part of the air flow (on the rear side of the vehicle) of the heater core 24 is made smaller, the temperature distribution of air blow into the vehicle compartment can be made uniform.

Since the space portion having the distance L1 is the mixing portion for mixing the hot air and the cold air, the reducing of the mixing portion of the hot air and the cold air and the enhancing of the degree of mixing of the hot air and the cold air can be achieved at the same time.

In addition, the enhancing of the degree of mixing of the cold air and the hot air is achieved by such an improved construction that the heating parts 27a, 27b and 27c and the cold air bypass passages 28a, 28b are alternately formed in the direction of the length of the tank (direction perpendicular to the air flow) in the heater core 24 itself. This can eliminate the need for especially providing an air guide for enhancing the degree of mixing of the cold air and the hot air. As a result, the degree of mixing of the cold air and the hot air can be enhanced without increasing a pressure loss of the air flow.

In this embodiment, the rotational positions of the right and left air mixing doors 31, 32 are independently controlled, so that the ratio between the hot air and the cold air in the right and left air passages 26a, 26b can be independently controlled. Accordingly, the temperature of the air blown into the vehicle compartment from the right and left air passages 26a, 26b can be independently controlled.

In FIG. 1, when the respective air mixing doors 31, 32 are operated to the positions shown by broken lines, the cold air bypass passages 28a, 28b, 29a and 29b are totally closed, thereby the maximum heating operation is set. In other words, the whole volume of the cold air after passing through the evaporator 23 passes through the three heating parts 27a, 27b and 27c of the heater core 24, thereby being heated and brought to the hot air. With this, maximum air heating performance can be effectively improved.

By contrast, when the respective air mixing doors 31, 32 are operated to the positions shown by the single dot and dash lines, the three heating parts 27a, 27b and 27c of the heater core 24 are totally closed, thereby the maximum cooling operation is set. In other words, the whole volume of cold air after passing through the evaporator 23 passes and flows through the four cold air bypass passages 28a, 28b, 29a, and 29b while bypassing the heater core 24.

In this embodiment, the heat transferring between the cold air bypass passages 28a, 28b, 29a, and 29b and the heating parts 27a, 27b, and 27c can be prevented effectively by the thermal insulating members 30. For this reason, even when hot water is circulated to the heater core 24 at the time of the maximum cooling operation, the maximum air cooling performance can be obtained.

In this embodiment, even if the heater core 24 has such a construction that the heating part is divided into the plural heating parts 27a, 27b and 27c, the top and bottom tank parts 24c, 24d and the hot water inlet piping 24g and the hot water outlet piping 24h are made common to the heating parts 27a, 27b and 27c. Hence, the heater core 24 can be integrated into one heat exchanger construction as a whole and becomes simple in construction.

Second Embodiment

FIG. 6 shows a second embodiment of the present invention. In the second embodiment, the cold air bypass passage 28a of the heater core 24 is formed at only one position in the center area in the direction of the length of the tank, and the heating parts 27a, 27c are formed on both the right and left sides of the cold air bypass passage 28a. The second embodiment is the same in the other points as the first embodiment, so the same parts are denoted by the same reference symbols and their descriptions will be omitted.

Figure 15:
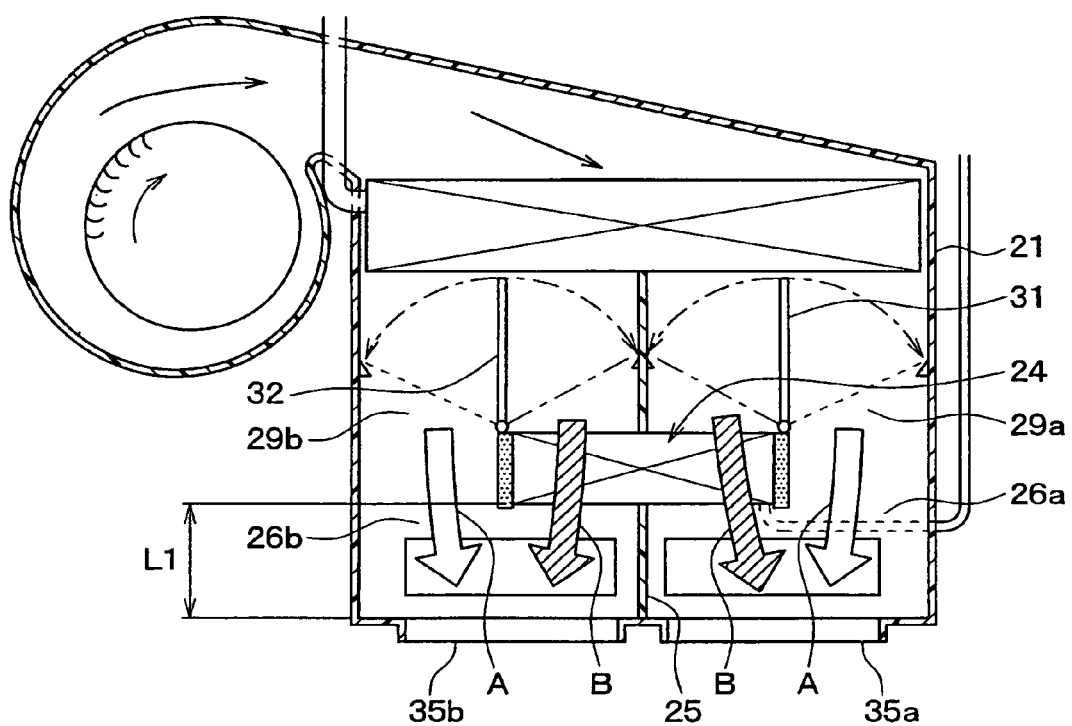
FIG. 15 is a cross-sectional view of an interior unit of an air conditioner for a vehicle according to a prior art.
Figure 16:
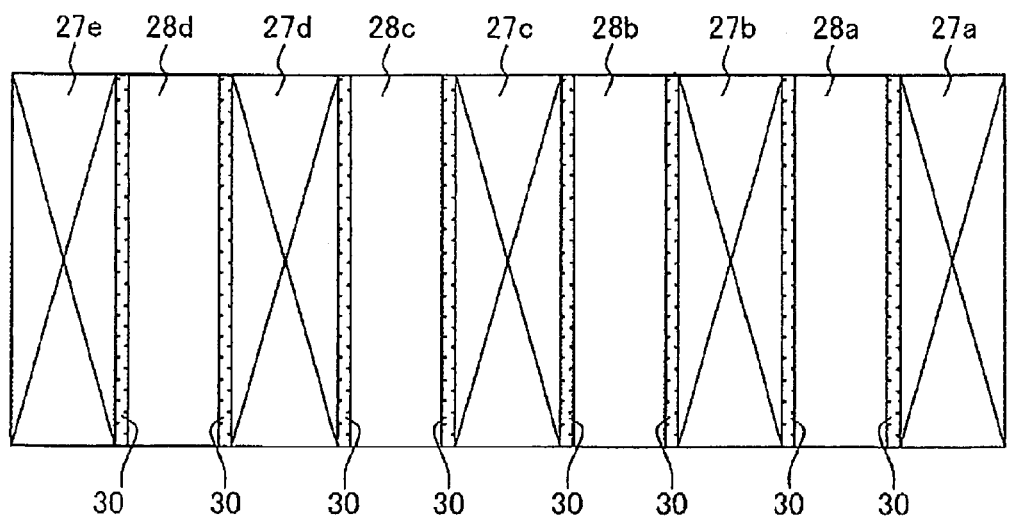
FIG. 16 is a front view of a heater core according to another embodiment of the present invention.

In the second embodiment, at four positions, the cold air is mixed with the hot air and the number of positions at which the cold air is mixed with the hot air is decreased as compared with the first embodiment. However, as compared with the comparative example shown in FIG. 15, the number of positions at which the cold air is mixed with the hot air is doubled, so the degree of mixing of the cold air and the hot air can be enhanced.

As described in the first and second embodiments, the number of positions where the cold air is mixed with the hot air can be suitably changed to a necessary number necessary for the air conditioning unit 2.

Third Embodiment

FIG. 7 shows a third embodiment in which the cold air bypass passage 28a and the heating parts 27a, 27c of the heater core 24 are arranged in the up and down direction. That is, one cold air bypass passage 28a is arranged in the middle (center) in the up and down direction of the heater core 24 and the heating parts 27a, 27c are arranged on both up and down sides of the cold air bypass passage 28a.

The cold air bypass passage 29a arranged outside of the heater core 24 is formed on the upper side of the upper heating part 27a.

There are provided three air mixing doors 31 rotated in the up and down direction in association with each other. When these three mixing doors 31 are rotated, the one cold air bypass passage 28a, the two heating parts 27a, 27c, and the one cold air bypass passage 29a arranged outside of the heater core 24 are opened or closed.

Also in the third embodiment, there are formed three positions where the cold air is mixed with the hot air, and hence the degree of mixing of the cold air and the hot air can be enhanced.

In this manner, even when the direction in which the cold air bypass passages 28a, 29a and the heating parts 27a, 27c are arranged is the horizontal direction, just as with the first and second embodiments, and when the direction is the up and down direction, just as with the third embodiment, the present invention can be implemented similarly.

The third embodiment is constructed in such a way that the dimension in the up and down direction of the lower heating part 27c is decreased to half the dimension in the up and down direction of the upper heating part 27a and that the cold air bypass passage outside of the heater core 24 is not formed under the lower heating part 27c. However, if the dimension in the up and down direction of the lower heating part 27c is the same as the dimension in the up and down direction of the upper heating part 27a and the cold air bypass passage is formed under the lower heating part 27c, the positions where the cold air is mixed with the hot air can be increased to four positions.

Although a structure in which the air passage in the case 21 is partitioned into the right and left air passages 26a, 26b by the partition plate 25 is not shown in the third embodiment, of course, the third embodiment may adopt this structure of partitioning the air passage into the right and left air passages 26a, 26b.

Fourth Embodiment

In the above-described first to third embodiments, the air mixing doors 31, 32 are constructed of rotatable plate doors. However, in a fourth embodiment, the air mixing door is constructed of a sliding door that slides along the surfaces of the heating parts 27a to 27c and the opening surfaces of the cold air bypass passages 28a, 28b, 29a and 29b of the heater core 24.

In the fourth embodiment, the partition plates 25 in the first and second embodiments are eliminated and the structure that the air passage in the case 21 is partitioned into the right and left air passages 26a, 26b is not adopted. Therefore, the air passage in the case 21 is a single air passage.

In the fourth embodiment, a single sliding door 31 is used for constructing the air mixing door. More specifically, the sliding door 31 is constructed of one plate-shaped member 310.

This plate-shaped member 310 is a solid body made of resin molded part and is arranged on an upstream side of the air flow of the heater core 24.

Figure 8:
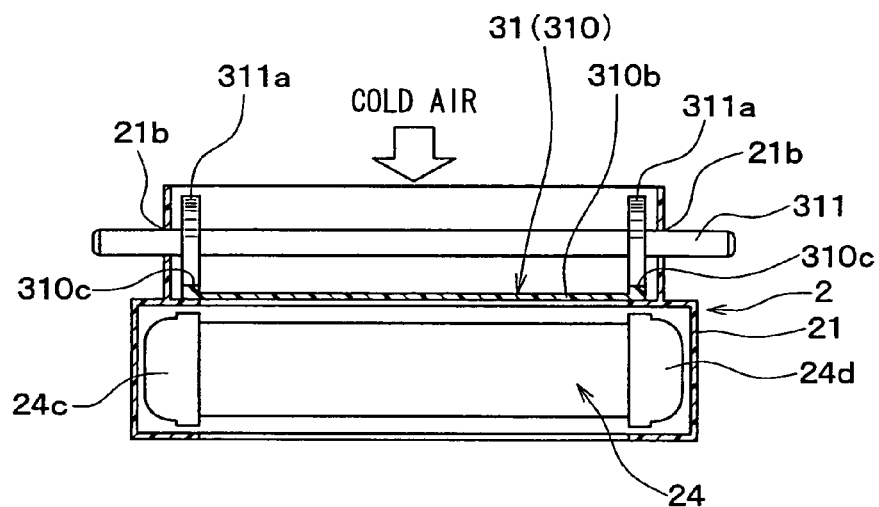
FIG. 8 is a cross-sectional view of a portion where a heater core is located in an air conditioning unit part according to a fourth embodiment of the present invention.
Figure 9:
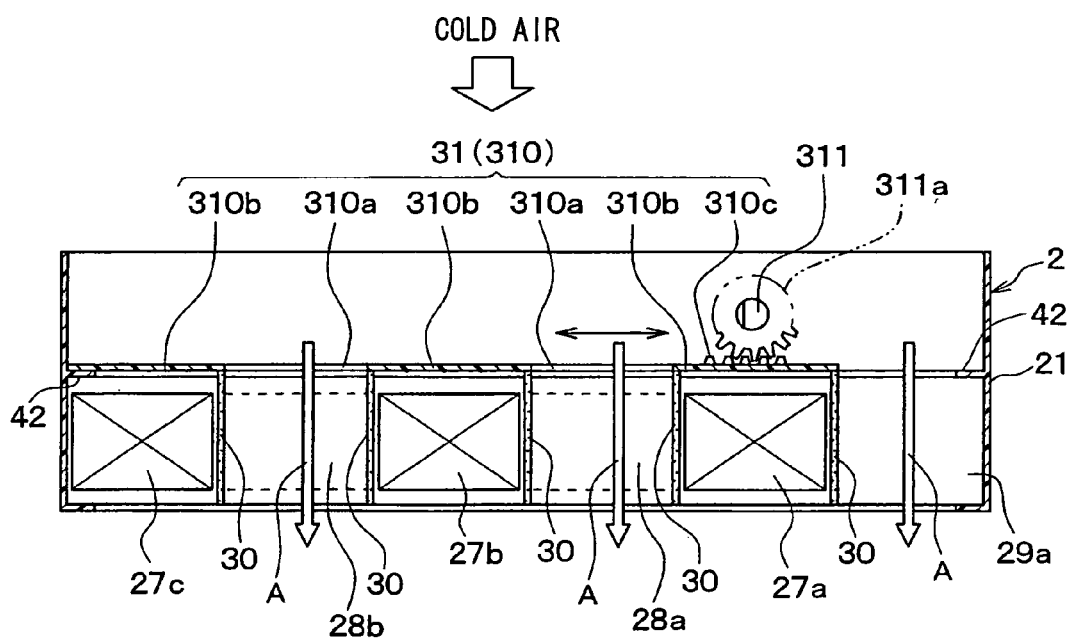
FIG. 9 is a schematic cross-sectional view showing the air conditioning unit part of FIG. 8 in a maximum cooling operation.

The heater core 24 of the fourth embodiment has two cold air bypass passages 28a, 28b and three heating parts 27a to 27c formed alternately in the direction of the length of the tanks 24c, 24d (in the direction perpendicular to the surface of paper in FIG. 8, in the right and left direction in FIG. 9 to FIG. 11). Furthermore, the cold air bypass passage 29a is arranged outside the heater core 24 formed on one side of the right end heating part 27a, as shown in FIG. 9 to FIG. 11.

The plate-shaped member 310 constructing the sliding door 31, as shown in FIG. 9 to FIG. 11, has two rectangular openings 310a through which air passes and three shutting portions (non-opening portions) 310b for shutting the air flow, which are formed alternately in the arrangement direction where the heating parts 27a to 27c and the cold air bypass passages 28a, 28b, 29a and 29b are arranged (i.e., in the direction of the length of the tank of the heater core 24).

Here, the openings 310a are provided to have an opening area to fully open the cold air bypass passages 28a, 28b at the time of the maximum cooling operation in FIG. 9 and to fully open the heating parts 27a, 27b at the time of the maximum heating operation in FIG. 11.

In contrast to this, the shutting portions 310b are provided to have an shutting area to close three heating parts 27a to 27c totally at the time of the maximum cooling operation in FIG.

9 and to close the cold air bypass passages 28a, 28b totally at the time of the maximum heating operation in FIG. 11.

Gear portions 310c are formed integrally with two end parts of the plate-shaped member 310 in the direction of length of the tube (in the right and left direction of FIG. 8) of the heater core 24. This gear parts 310c are racks extending straight in the arrangement direction in which the heating parts 27a to 27c and the cold air bypass passages 28a, 28b, 29a, and 29b are arranged (in the direction of the length of the tank).

These gear parts 310c are arranged at portions where the tank parts 24c, 24d of the heater core 24 are formed, as shown in FIG. 8, to prevent resistance to air flow from being increased by the formation of the gear parts 310c.

In the case 21, a door driving shaft 311 is arranged on an upstream side of the air flow of the sliding door 31. This door driving shaft 311 is arranged so as to extend in the direction of the length of the tube of the heater core 24 (in the right and left direction in FIG. 8) and both end portions in the axial direction of the door driving shaft 311 are rotatably supported by the bearing holes 21b of the case 21.

One end portion of the door driving shaft 311 is coupled to an air mixing door driving mechanism via a link mechanism (not shown) in the outside of the case 21 and the door driving shaft 311 is rotated and driven by this air mixing door driving mechanism.

The door driving shaft 311 is made of resin in this embodiment and gears 311a constructing pinions are formed integrally with the door driving shaft 311. These gears 311a are formed at positions corresponding to the gear parts 310c of the plate-shaped member 310 and are engaged with these gear portions 310c.

In the fourth embodiment, a thermal insulating wall member 30 of a solid body made of resin is used as a member corresponding to the thermal insulating members 30 in the first and third embodiments. This thermal insulating wall member 30 is constructed of one member having two rectangular cylindrical portions along the peripheral edge of the rectangular cross-sectional shape of two cold air bypass passages 28a, 28b, and one plate-shaped wall portion along the outside surface of the heating part 27a on the right end, and connecting these two cylindrical portions and one plate-shaped wall portion integrally at connecting portions (not shown). These connecting portions (not shown) are formed along the surfaces of two tank parts 24c, 24d of the heater core 24.

The thermal insulating wall member 30 is set in the two cold air bypass passages 28a, 28b and on the outside surfaces of the heating part 27a on the right end of the heater core 24 in a state where the heater core 24 is not yet set in the case 21 but is a single body.

The plate surfaces on the downstream side of the air flow of the shutting portions 310b of the plate-shaped member 310 contact the upstream end portions of the air flow of the thermal insulating wall member 30. Therefore, the upstream end portions of the air flow of the thermal insulating wall member 30 act as the seal surface of the plate-shaped member 310.

Moreover, a seal wall surface 42 projecting inward like a picture frame is formed integrally with the inside walls of the case 21 in a projecting manner at an upstream portion of the air flow of the heater core 24. For this reason, the plate surfaces on the downstream side of the air flow of the shutting portions 310 of the plate-shaped member 310 contact also the seal wall surface 42 of this case 21.

Next, the operation of the fourth embodiment will be described. In FIG. 9, the gears 311a of the door driving shaft 311 of the sliding door 31 are engaged with the gear portions 310c of the plate-shaped member 310 to move the plate-shaped member 310 to the most left position.

With this, the three shutting portions 310b of the plate-shaped member 310 just overlap the three heating parts 27a to 27c of the heater core 24, thereby totally closing all of these heating parts 27a to 27c. At the same time, the two openings 310a of the plate-shaped member 310 just overlap the two cold air bypass passages 28a, 28b, thereby fully opening these two cold air bypass passages 28a, 28b. Moreover, since the plate-shaped member 310 moves to the left side of the cold air bypass passage 29a arranged outside the heater core 24, the plate-shaped member 310 opens also this cold air bypass passage 29a fully, as shown in FIG. 9.

In the manner described above, the whole volume of the cold air cooled by the evaporator 23 flows through the cold air bypass passages 28a, 28b, and 29a, so the state of the maximum cooling operation is set.

Next, FIG. 10 shows a state where the gears 311a of the door driving shaft 311 are engaged with the gear portions 310c of the plate-shaped member 310 to move the plate-shaped member 310 from the position shown in FIG. 9 to a right side by a predetermined amount. At the position of the sliding door 31 shown in FIG. 10, the central portion of the three shutting portions 310b of the plate-shaped member 310 is located above the thermal insulating wall member 30.

With this, the three heating parts 27a to 27c, the cold air bypass passages 28a, 28b of the heater core 24 and the cold air bypass passage 29a are brought to a half-open state. Thus, about half of the cold air cooled by the evaporator 23 passes through the heating parts 27a to 27c and becomes hot air B and remaining about half of the cold air passes through the cold air bypass passages 28a, 28b, and 29a, as it is cold air A, and is not heated.

Hence, the temperature of air blown into the vehicle compartment can be controlled to a predetermined middle temperature determined by the ratio between the cold air A and the hot air B. In this case, according to the fourth embodiment, five portions "a" to "e" are formed where the cold air A comes in contact with (mixes with) the hot air B, so the degree of mixing of the cold air A and the hot air B can be enhanced.

Further, in the fourth embodiment, the air mixing door is constructed of the sliding door 31 sliding along the surfaces of the heating parts 27a to 27c and the opening surfaces of the cold air bypass passages 28a, 28b, and 29a. Hence, the fourth embodiment provides the following advantages.

Since the sliding door 31 can be constructed of one plate-shaped member 310, the sliding door 31 can be extremely simplified as compared with the a case where a plurality of plate doors are rotated and operated in association with each other. In addition, since the plate-shaped member 310 is slid along the surfaces of the heating parts 27a to 27c and the opening surfaces of the cold air bypass passages 28a, 28b, and 29a, the plate-shaped member 310 does not need a space where the plate door is rotated and operated and hence can decrease a door installation space.

Moreover, a cold air passing area and a hot air passing area can be changed linearly with respect to the amount of movement of the plate-shaped member 310 (the amount of sliding door) by the plurality of openings 310a and shutting portions 310b which are alternately formed in the plate-shaped member 310. Hence, the linear controllability of the temperature of air blown into the vehicle compartment can be made excellent.

Fifth Embodiment

Figure 12:
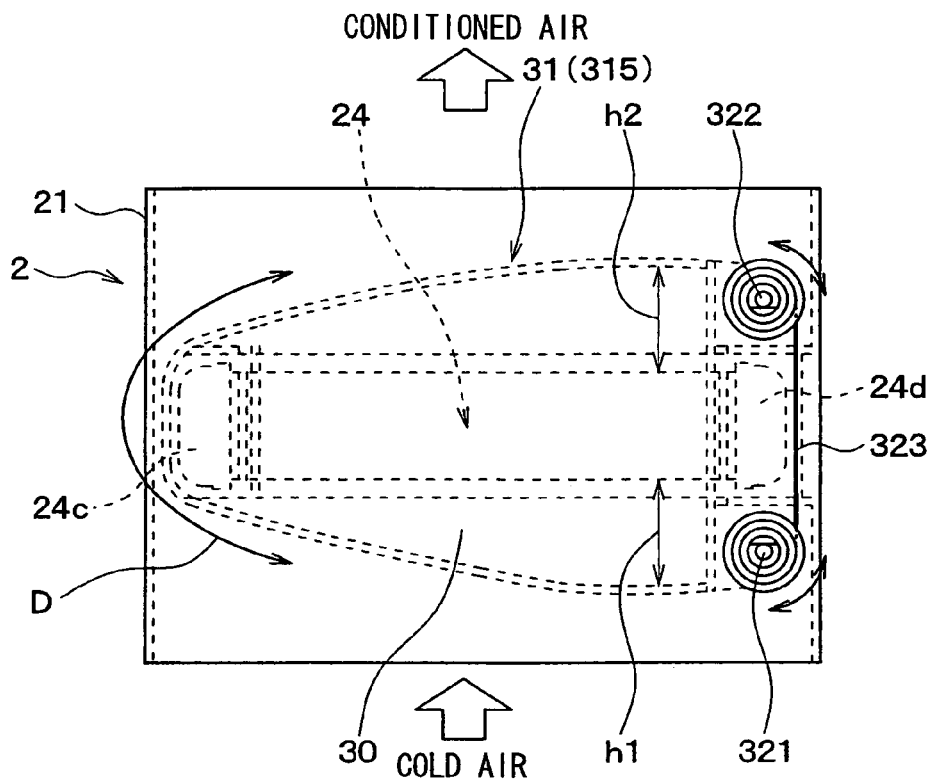
FIG. 12 is a side view of a portion where a heater core is set in an air conditioning unit part according to a fifth embodiment of the present invention.
Figure 13:
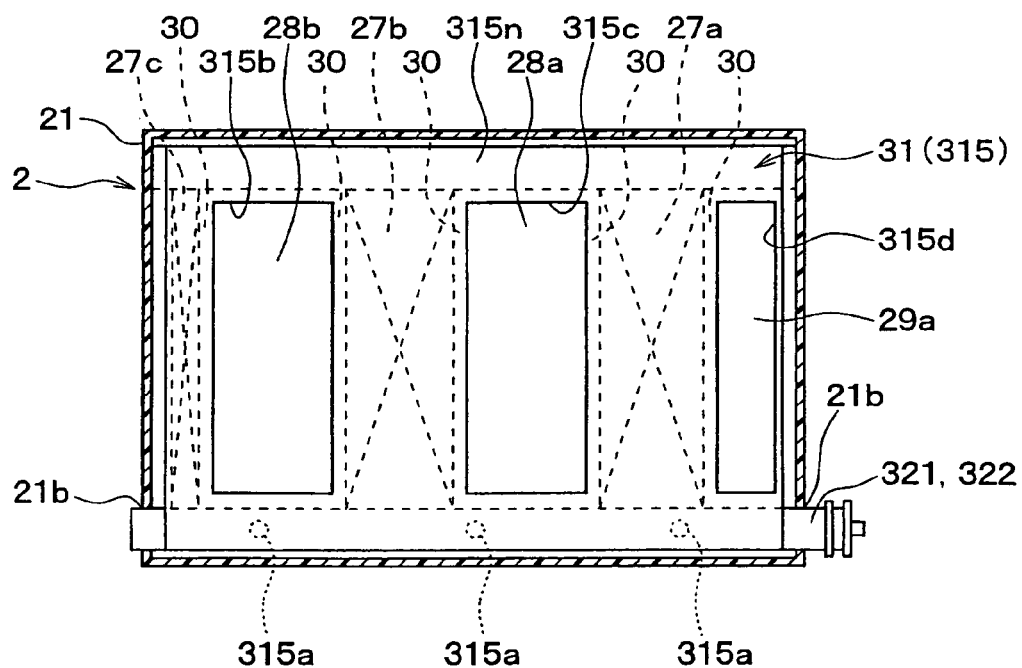
FIG. 13 is a cross-sectional view showing a front part of a heater core in the air conditioning unit part according to the fifth embodiment in a maximum cooling operation.
Figure 14:
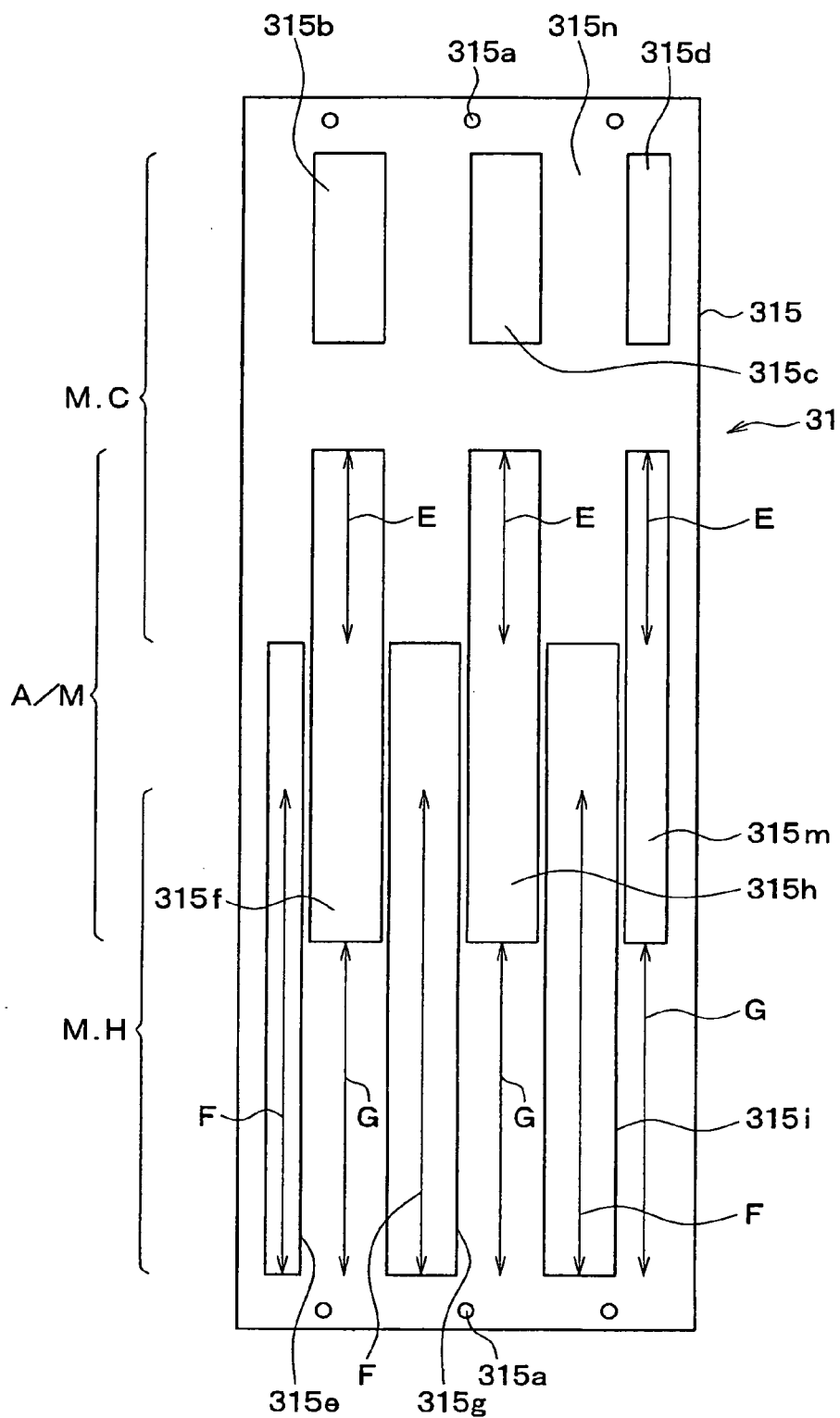
FIG. 14 is a development view to show the opening pattern of a film-shaped member according to the fifth embodiment.

FIG. 12 to FIG. 14 show a fifth embodiment in which the air mixing door is constructed of a sliding door, just as with the fourth embodiment. In the above-described fourth embodiment, the sliding door 31 is constructed of one plate-shaped member 310 made of a solid body. However, in the fifth embodiment, the sliding door 31 is constructed of one flexible film-shaped member 315. This film-shaped member 315 is constructed of a resin film member having a thin film shape and is generally called a film door.

FIG. 12 is a side view of a portion where the heater core 24 is set in the air conditioning unit 2 according to the fifth embodiment when viewed from the projecting end side of the windup shaft of the film-shaped member 315. FIG. 13 is a schematic cross-sectional view, when viewed from the front direction of the heater core 24, of the air conditioning unit 2 and shows the state of the maximum cooling operation. FIG. 14 is a development view showing an opening pattern of the film-shaped member 315.

In the fifth embodiment, the air passage in the case 21 is not partitioned into the right and left air passages. That is, the fifth embodiment adopts a structure in which the air passage in the case 21 is a single air passage. However, the fifth embodiment may adopt a structure in which the air passage in the case 21 is partitioned into the right and left air passages 26a, 26b as in the above-described first embodiment.

The film-shaped member 315, as shown in FIG. 12, is bent approximately in the shape of a letter U by one tank part 24c of the heater core 24 and is arranged so as to cover both surfaces on the upstream air side and on the downstream air side of the heater core 24.

Also in the fifth embodiment, the thermal insulating wall member 30 used in the fourth embodiment is provided in the two cold air bypass passages 28a, 28b and on the outside surface of the heating part 27a on the right side of the heater core 24. The thermal insulating wall member 30 is located to insulate heat from the heating parts 27a, 27b, 27c to the cold air bypass passages 28a, 28b, 29a. However, in the fifth embodiment, the film-shaped member 315 moves at a position separate from the surfaces of the heating parts 27a to 27c of the heater core 24.

Thus, in the fifth embodiment, the upstream end portion and the downstream end portion of the air flow of the thermal insulating wall member 30 are projected to the position of the movement locus of the film-shaped member 315, respectively, and the film-shaped member 315 located at the upstream side of the heater core 24 is supported by the upstream end portion of the air flow of the thermal insulating member 30 and the film-shaped member 315 located on the downstream side of the heater core 24 is supported by the downstream end portion of the air flow of the thermal insulating member 30.

In FIG. 12, each of reference symbols h1, h2 denotes the amount of projection such that the thermal insulating wall member 30 projects to the film-shaped member 315 side from the surfaces of the heating parts 27a to 27c of the heater core 24. Specifically, the thermal insulating wall member 30 projects to the upstream air side from the upstream surface of the heater core 24 by a maximum dimension of hi, and the thermal insulating wall member 30 projects to the downstream air side from the downstream surface of the heater core 24 by a maximum dimension of h2.

Both end portions of the film-shaped member 315 in the direction of the length (longitudinal direction) are coupled to two windup shafts 321, 322 arranged on the upstream side and the downstream side of the air flow of the other tank part 24d of the heater core 24.

Specifically, a plurality of coupling holes 315a are formed in both the end portions in the direction of the length of the film-shaped member 315 and pin-shaped members (not shown) of the windup shafts 321, 322 side are put into these coupling holes 315a to fix both the end portions in the direction of the length of the film-shaped member 315 to the windup shafts 321, 322. The two windup shafts 321, 322 are rotatably supported by the bearing holes 21b of the case 21 and the two windup shafts 321, 322 are coupled to each other by a coupling wire 323.

Then, either one of the two windup shafts 321, 322, for example, the windup shaft 321 is coupled to an air mixing door driving mechanism via a link mechanism (not shown) in the outside of the case 21 and the one windup shaft 321 is rotated and driven by the air mixing door mechanism. Then, the other windup shaft 322 is also rotated and driven in association with this via the coupling wire 323.

In this manner, since the two windup shafts 321, 322 are rotated in association with each other, one windup shaft 321 winds up or back the one end portion in the direction of the length of the film-shaped member 315 and at the same time the other windup shaft 322 reversely winds back or up the other end portion in the direction of the length of the film-shaped member 315.

With this, the film-shaped member 315 can move (reciprocate) in the direction to cross the air passing through the heater core 24 (e.g., in the direction perpendicular to the air flow) while sliding on the outside surface of the one tank part 24c of the heater core 24 and the end portion of the thermal insulating wall member 30, as shown by the arrow D in FIG. 12.

More specifically, the film-shaped member 315 is movable in the direction perpendicular to the arrangement direction in which the heating parts 27a to 27c and the cold air bypass passages 28a, 28b, and 29a of the heater core 24 are arranged (in the vertical direction in FIG. 12).

Next, the opening pattern of the film-shaped member 315 will be described with reference to FIG. 14. The film-shaped member 315 has a plurality of openings 315b to 315m for passing air and a shutting portion (non-opening portion) 315n.

The openings 315b to 315m are rectangles each having long sides in the direction of the length of the film-shaped member 315. The sizes of the short sides (widths) of the openings 315b, 315f, 315c and 315h are the same as the sizes of the short sides (widths) of the two cold air bypass passages 28a, 28b of the heater core 24. The sizes of the short sides (widths) of the openings 315d, 315m are the same as the size of the short side (width) of the cold air bypass passage 29a arranged outside the heater core 24.

Moreover, the size of the short side (width) of the opening 315e is the same as the size of the short side (width) of the heating part 27c. The sizes of the short sides (widths) of the opening 315g, 315i are the same as the sizes of the short sides (widths) of the heating parts 27b, 27a.

FIG. 13 shows the state of the maximum cooling operation and M, C region in FIG. 14 shows positions at the time of the maximum cooling operation. At the time of the maximum cooling operation, the openings 315b, 315c and 315d overlap one of the upstream side and the downstream side of the air flow of the cold air bypass passages 28a, 28b and 29a and the M, C region (portions shown by arrows E in FIG. 14) of the openings 315f, 315h and 315m overlap the other sides of the cold air bypass passages 28a, 28b and 29a, thereby all of these cold air bypass passages 28a, 28b and 29a are fully opened.

In contrast to this, the shutting portion 315n of the film-shaped member 315 in the M, C region overlaps the upstream side and the downstream side of the air flow of the three heating parts 27a to 27c of the heater core 24, so all of the air flows are interrupted in the three heating parts 27a to 27c.

As described above, the whole volume of the cold air cooled by the evaporator 23 flows through the cold air bypass passages 28a, 28b, and 29a, so that the maximum cooling operation is set.

Here, the upstream side and the downstream side of the air flow in the three heating parts 27a to 27c are covered by the shutting portion 315n of the film-shaped member 315. More specifically, the shutting portion 315n of the film-shaped member 315 slides on the upstream end portion and the downstream end portion of the thermal insulating wall member 30, so that the spaces of the heating parts 27a to 27c can be closed with respect to the cold air bypass passages 28a, 28b, and 29a by the shutting portion 315n of the film-shaped member 315 and the thermal insulating wall member 30.

For this reason, even in a construction in which the hot water circuit of the heater core 24 is not provided with a hot water valve and in which hot water is circulated in the heater core 24 also at the time of the maximum cooling operation, the hot air heated by the heating parts 27a to 27c is prevented from mixing with the cold air flow by natural convection. Hence, even in the construction without the hot water valve, the maximum air cooling performance can be exerted with reliability.

The film-shaped member 315 may be easily deformed downwardly by air pressure on the upstream side of the air flow of the heater core 24. However, the film-shaped member 315 moved while sliding on the upstream end portion of the air flow of the thermal insulating wall member 30. Accordingly, the film-shaped member 315 can be prevented from being deformed to downward by the air pressure.

The M, H region in FIG. 14 shows positions at the time of the maximum heating operation of the film-shaped member 315. At the time of the maximum heating operation, the M, H region (portions shown by arrows F near the bottom) of the openings 315e, 315g, and 315i overlap the upstream side and the downstream side of the air flow of the three heating part 27a to 27c to open the three air passages 27a to 27c fully.

At the same time, portions shown by arrows G near the bottom of the M, H region of the shutting portion 315n of the film-shaped member 315 overlap the opening surfaces of the three cold air bypass passages 28a, 28b and 29a, thereby closing the three cold air bypass passages 28a, 28b, and 29a totally.

With this, the whole volume of the cold air passing through the evaporator 23 passes through the heating parts 27a to 27c, thereby being heated and brought to hot air, so the state of the maximum heating operation is set.

Here, of the cold air bypass passages 28a, 28b and 29a, only the opening surfaces of one side of the upstream side and the downstream side of the air flow are totally closed by the portions shown by the arrows G of the shutting portion 315n, and the opening surfaces of the other side are opened by the portions near the bottoms of the openings 315f, 315h and 315m. Even in this case, the cold air flow passing through the cold air bypass passages 28a, 28b, and 29a can be effectively shut in the maximum heating operation.

The A/M region in FIG. 14 shows an air mixing region where the ratio of air volume between the cold air and the hot air is adjusted to control the temperature of air to be blown, that is, a middle temperature control region. At the time of this middle temperature control, when the operating position of the film-shaped member 315 is moved to the upper side in FIG. 14, the rate of opening areas of the cold air bypass passages 28a, 28b, and 29a by the openings 315f, 315h and 315m is increased, and the rate of opening areas of the heating parts 27a to 27c by the openings 315e, 315g, and 315i is decreased. With this, the ratio of the cold air volume to the hot air volume is increased to decrease the temperature of air to be blown.

In contrast to this, when the operating position of the film-shaped member 315 is moved to the lower side in FIG. 14, the rate of opening areas of the cold air bypass passages 28a, 28b and 29a by the openings 315f, 315h, and 315m is decreased, and the rate of opening areas of the heating parts 27a to 27c by the openings 315e, 315g and 315i is increased. With this, the ratio of the hot air volume to the cold air volume is increased to increase the temperature of air to be blown.

In a case where the sliding door 31 is constructed of one plate-shaped member 310 made of a solid body, just as with the fourth embodiment, when the numbers of lines of arrangement of the heating parts and the cold air bypass passages are increased, the length in the direction of movement (length in the right and left direction in FIG. 9 to FIG. 11) of the plate-shaped member 310 is increased along with the increase in the numbers of lines of arrangement. In contrast to this, the amount of movement of the plate-shaped member 310 (the distance between the operating position at the time of the maximum cooling operation and the operating position at the time of the maximum heating operation) is not changed, so the temperature resolution ability (minimum temperature range to be adjustable) relative to the temperature of air to be blown is decreased.

In contrast to this, the sliding door 31 according to the fifth embodiment is constructed of the flexible film-shaped member 315 and the film-shaped member 315 is movable in the direction perpendicular to the arrangement direction in which the heating parts 27a to 27c and the cold air bypass passages 28a, 28b and 29a of the heater core 24 are arranged (in the direction vertical to the surface of paper in FIG. 12). Thus, even if the numbers of lines of arrangement of the heating parts and the cold air bypass passages are increased, it is possible to respond to the increase in the numbers of the lines of arrangement by enlarging the size of width (size of short side) of the film-shaped member 315 and hence to provide the advantage of preventing a decrease in the temperature resolution ability relative to the temperature of air to be blown.

Moreover, in the fourth embodiment, resistance to the air flow is caused by the shutting portions 310b of the plate-shaped member 310 in the state of the middle temperature control in FIG. 10 so as to increase a pressure loss at the time of the middle temperature control. However, according to the fifth embodiment, also at the time of the middle temperature control, while the air passages on the heating part 27a to 27c side are opened by the openings 315e, 315g and 315i, the cold air bypass passages 28a, 28b, and 29a can be opened by the openings 315f, 315h and 315m at the same time. Hence, the fifth embodiment provides the advantage of decreasing a pressure loss at the time of the middle temperature control, as compared with the fourth embodiment.

Other Embodiments

Although the present invention has been fully described in connection with the preferred embodiments thereof with reference to the accompanying drawings, it is to be noted that various changes and modifications will become apparent to those skilled in the art.

(1) For example, in the fourth embodiment, the sliding door 31 is constructed of the plate-shaped member 310 made of a solid body. However, the sliding door 31 in the fourth embodiment may be constructed of the flexible plate-shaped member 310.

(2) In the fifth embodiment, the film-shaped member 315 is moved in the direction approximately perpendicular to the arrangement direction in which the heating parts 27a to 27c and the cold air bypass passages 28a, 28b and 29a of the heater core 24 are arranged. However, the film-shaped member 315 may be moved in the arrangement direction in which the heating parts 27a to 27c and the cold air bypass passages 28a, 28b and 29a of the heater core 24 are arranged.

(3) In the first and second embodiments is adopted the construction of a left-and-right independent temperature control type in which the air passage in the case 21 is partitioned into the right and left air passages 26a, 26b by the partition plate 25. However, the first and second embodiment may adopt a construction of the type in which the air passage in the case 21 is made a single air passage without using the partition plate.

(4) In the above-described respective embodiments, the examples have been described in which the evaporator 23 (cooling heat exchanger) is arranged. However, the present invention may be applied to an air conditioner not having the evaporator 23. In this case, air not cooled by the evaporator 23 flows into the heater core (heating heat exchanger) 24.

Hence, the cold air flowing into the heater core 24 is not limited to only the cold air cooled by the evaporator 23 but may be air not cooled by the evaporator 23 (not-cooled air).

(5) In the above-described respective embodiments is adopted a construction in which a hot water flow in the heater core 24 flows in one direction from one tank part 24c to the other tank part 24d. However, the construction may be modified as follows: the hot water flow is brought to a U-turn before and after the air flow (in the direction vertical to the surface of paper in FIG. 4A); or the hot water flow is brought to a U-turn in the direction perpendicular to the air flow (in the right and left direction of the surface of paper in FIG. 4A).

(6) In the above-described respective embodiments has been described the heater core 24 for heating air by using hot water (engine cooling water) as a heat source fluid. However, the heater core 24 may heat air by using the high-temperature working oil of a hydraulic device as a heat source fluid in place of the hot water.

(7) In the above-described embodiments, the present invention is typically used for the heater core 24 as the heating heat exchanger; however, the present invention can be used for a heat exchanger in which a thermal fluid flowing in the tubes 24a exchanges heat with air passing through the heat exchanger outside the tubes 24a. That is, the heat exchanger according to the present invention is not limited to the heater core 24 only when the thermal fluid flowing in the tubes 24a is heat exchanged with air passing the heat exchanger outside the tubes 24a.

Such changes and modifications are to be understood as being within the scope of the present invention as defined by the appended claims.

What is claimed is:

1. A heating heat exchanger for heating air, the heat exchanger comprising:
   a plurality of tubes which are arranged in parallel and through which a thermal fluid for heating air flows;
   a plurality of fins which are joined to the tubes and form heat transfer surfaces in contact with the air, wherein the tubes and the fins are arranged to form at least three heating parts in which the air is heated;
   a plurality of bypass passages each of which is provided between adjacent heating parts, through which the air passes without exchanging heat with the thermal fluid;
   first and second tank parts, for distributing the thermal fluid to the tubes and for collecting the thermal fluid from the tubes, which are arranged at two longitudinal ends of the tubes and extend to across an area where the bypass passages and the heating parts are provided; and
   a thermal insulating portion arranged at a boundary area between each bypass passage and an adjacent heating part, the thermal insulating portion extending along the bypass passage and the adjacent heating part in an air flow direction;
   wherein the bypass passages and the heating parts are arranged in an arrangement direction perpendicular to an air flow direction.

2. The heating heat exchanger according to claim 1, wherein the tubes are arranged to extend in a direction perpendicular to the arrangement direction and the air flow direction, and
   wherein the first tank part is joined to one longitudinal end of each tube and the second tank part is joined to the other longitudinal end of each tube.

3. The heating heat exchanger according to claim 1, further comprising
   a thermal insulating member that is arranged at boundary areas between each bypass passage and the tank parts.

4. The heating heat exchanger according to claim 1, wherein:
   the first tank has a thermal fluid inlet from which the thermal fluid is introduced; and
   the second tank has a thermal fluid outlet from which the thermal fluid collected to the second tank from the tubes is discharged.

5. The heating heat exchanger according to claim 1, wherein each bypass passage has a predetermined dimension in the arrangement direction, that is larger than a dimension between adjacent tubes in each heating part in the arrangement direction.

6. The heating heat exchanger according to claim 1, wherein the thermal insulating portion extends in a direction parallel with the air flow direction and extends across the entire length of the heating part in the air flow direction.

7. The heating heat exchanger according to claim 1, wherein a surface of the heating parts through which air flows is generally perpendicular to the air flow.

8. The heating heat exchanger according to claim 1, wherein a width of at least one bypass passage is generally equal to a width of at least one heating part in a direction perpendicular to the air flow and parallel to the arrangement direction.

9. An air conditioner for adjusting temperature of air to be blown into a compartment, the air conditioner comprising:
   a case for defining an air passage through which air flows into the compartment;
   a heating heat exchanger which is located in the case to heat air in the air passage; and
   a door member which is located in the case, wherein:
   the heating heat exchanger includes
      a plurality of tubes which are arranged in parallel and through which a thermal fluid for heating air flows,
      a plurality of fins which are joined to the tubes and form heat transfer surfaces in contact with the air, wherein the tubes and the fins are stacked to form at least three heating parts in which the air is heated,
      a plurality of inner bypass passages each of which is provided between adjacent heating parts, through which the air passes without exchanging heat with the thermal fluid,
      first and second tank parts, for distributing the thermal fluid to the tubes and for collecting the thermal fluid from the tubes, which are arranged at two longitudinal ends of the tubes and extend to across an area where the inner bypass passages and the heating parts are provided, and a thermal insulating member that is arranged at boundary areas between each inner bypass passage and the heating parts and at boundary areas between each inner bypass passage and the tank parts, wherein the inner bypass passages and the heating parts are arranged in an arrangement direction perpendicular to an air flow direction within the heating heat exchanger, and wherein the door member is located to adjust a flow ratio between an air amount passing through the heating parts and an air amount passing through the inner bypass passages, thereby adjusting a temperature of the air which flows into the compartment.

10. The air conditioner according to claim 9, wherein the heating heat exchanger is located in the case to have an outer bypass passage outside of the heating heat exchanger within the case, through which air bypasses the heating heat exchanger, and wherein the door member is located to open and close the inner bypass passages, the outer bypass passage and air paths of the heating parts.

11. The air conditioner according to claim 10, wherein the outer bypass passage is provided at two outer sides of the heating parts positioned at two end parts in the heating heat exchanger in the arrangement direction.

12. The air conditioner according to claim 10, wherein the door member is a slidable door that is slidable along surfaces of the heating parts and an open surface of the inner bypass passage.

13. The air conditioner according to claim 12, wherein the slidable door includes a rigid plate member slidable along the arrangement direction where the heating parts, the inner bypass passages and the outer bypass passage are arranged, and wherein the rigid plate member has an open portion through which air passes, and a shutting portion which shuts the air flow.

14. The air conditioner according to claim 12, wherein the slidable door includes a flexible film member having an open portion through which air passes, and a shutting portion which shuts the air flow.

15. The air conditioner according to claim 14, wherein the film member is movable in a direction perpendicular to the arrangement direction where the heating parts, the inner bypass passages and the outer bypass passage are arranged.

16. The air conditioner according to claim 14, wherein the film member is movable in a state where both upstream and downstream sides of the heating heat exchanger in the air flow direction are covered by the film member.

17. The air conditioner according to claim 9, wherein the door member is a rotatable plate door having a rotation shaft.

18. The air conditioner according to claim 17, wherein the rotation shaft is located at a boundary area between each inner bypass passage and the heating part in the arrangement direction.

19. The air conditioner according to claim 9, wherein the door member is movable to a position blocking air flow from flowing through the heating parts.

20. The air conditioner according to claim 9, wherein a width of at least one bypass passage is generally equal to a width of at least one heating part in a direction perpendicular to the air flow and parallel to the stacked direction.

21. The air conditioner according to claim 9, wherein the tubes and the fins are stacked with each other in the tank longitudinal direction.

* * * * *